(12) United States Patent
Murarka et al.

(10) Patent No.: US 9,336,604 B2
(45) Date of Patent: May 10, 2016

(54) SYSTEM AND METHOD FOR GENERATING A DEPTH MAP THROUGH ITERATIVE INTERPOLATION AND WARPING

(71) Applicant: Honda Motor Co., Ltd., Tokyo (JP)

(72) Inventors: Aniket Murarka, San Jose, CA (US); Nils Einecke, Offenbach/Main (DE)

(73) Assignee: Honda Motor Co., Ltd., Tokyo (JP)

( * ) Notice: Subject to any disclaimer, the term of this patent is extended or adjusted under 35 U.S.C. 154(b) by 158 days.

(21) Appl. No.: 14/297,792

(22) Filed: Jun. 6, 2014

(65) Prior Publication Data

US 2015/0228079 A1 Aug. 13, 2015

Related U.S. Application Data

(60) Provisional application No. 61/937,496, filed on Feb. 8, 2014.

(51) Int. Cl.
*G06T 15/00* (2011.01)
*G06T 7/00* (2006.01)

(52) U.S. Cl.
CPC .................................. *G06T 7/0075* (2013.01)

(58) Field of Classification Search
CPC ......... G06T 19/00; G06T 17/20; G06T 15/40; G06T 7/0075; G06T 3/0093; G06T 7/0065; G06T 7/0022
USPC ......... 345/418, 419, 420, 421, 422, 424, 427, 345/501, 619; 382/100, 154, 276
See application file for complete search history.

(56) References Cited

U.S. PATENT DOCUMENTS

| 6,377,712 | B1 * | 4/2002 | Georgiev ................ G06T 13/80 345/619 |
| 7,161,606 | B2 | 1/2007 | González-baños et al. |
| 8,384,763 | B2 | 2/2013 | Tam et al. |

(Continued)

FOREIGN PATENT DOCUMENTS

DE        EP 2775723   A1 *   9/2014   ......... H04N 13/0011

OTHER PUBLICATIONS

Kang, S. B., & Szeliski, R. (2004): "Extracting view-dependent depth maps from a collection of images", International Journal of Computer Vision, 58(2), pp. 139-163.*

(Continued)

*Primary Examiner* — Xiao Wu
*Assistant Examiner* — Sarah Lhymn
(74) *Attorney, Agent, or Firm* — Rankin, Hill & Clark LLP

(57) ABSTRACT

A computer-implemented method for generating a depth map including, generating an initial depth map for a first image, the first image being one of a pair of stereo images received from an imaging device, the pair of stereo images including the first image and a second image and generating an estimated depth map based on the initial depth map by hypothesizing depth values for missing regions in the initial depth map. The method including warping the second image based on the estimated depth map, generating a warped depth map based on the first image and the warped second image, and generating a new depth map for the first image relative to the second image based on the warped depth map and the estimated depth map.

18 Claims, 5 Drawing Sheets

(56) References Cited

U.S. PATENT DOCUMENTS

| | | |
|---|---|---|
| 8,411,149 B2 | 4/2013 | Maison et al. |
| 2011/0128352 A1* | 6/2011 | Higgins ............. A61B 1/00147 348/46 |
| 2012/0257814 A1 | 10/2012 | Kohli et al. |
| 2013/0010073 A1 | 1/2013 | Do et al. |
| 2013/0127988 A1* | 5/2013 | Wang ................... G06T 15/205 348/43 |
| 2013/0266213 A1 | 10/2013 | Yamashita et al. |
| 2014/0055446 A1* | 2/2014 | Corral-Soto ......... H04N 13/026 345/419 |

OTHER PUBLICATIONS

Vázquez, C., Tam, W. J., & Speranza, F. (Oct. 2006), "Stereoscopic imaging: filling disoccluded areas in depth image-based rendering", In Optics East 2006 (pp. 63920D1-63920D12). International Society for Optics and Photonics.*

Yun, Y., Bae, J., & Kim, J. (Nov. 2011): "Adaptive multidirectional edge directed interpolation for selected edge regions", In TENCON 2011—2011 IEEE Region 10 Conference (pp. 385-388), IEEE.*

* cited by examiner

SYSTEM AND METHOD FOR GENERATING A DEPTH MAP THROUGH ITERATIVE INTERPOLATION AND WARPING

RELATED APPLICATIONS

This application claims priority to U.S. Provisional Application Ser. No. 61/937,496 filed on Feb. 8, 2014, which is expressly incorporated herein by reference.

BACKGROUND

Computer stereo vision systems typically include two cameras to obtain two different views of the same image scene. Objects and surfaces in the two different views may appear at slightly different locations due to the cameras' different perspectives on the image scene. Local block matching stereo methods may be used to recover depths from the two different views. However, it may be difficult to recover depths of objects and surfaces in views with complicated surfaces, for example, non-textured surfaces and slanted surfaces. Thus, local block matching stereo methods for recovering depths from camera images typically fail to determine valid depths due to fronto-parallel assumption and lack of texture, among other issues.

BRIEF DESCRIPTION

According to one aspect, a computer-implemented method for generating a depth map includes generating an initial depth map for a first image, the first image being one of a pair of stereo images received from an imaging device, the pair of stereo images including the first image and a second image, generating an estimated depth map based on the initial depth map by hypothesizing depth values for missing regions in the initial depth map, and warping the second image based on the estimated depth map. The method includes generating a warped depth map based on the first image and the warped second image, and generating a new depth map for the first image relative to the second image based on the warped depth map and the estimated depth map.

According to another aspect, a non-transitory computer readable medium includes instructions that when executed by a processor perform a method for generating a depth map, including generating an initial depth map for a first image, the first image being one of a pair of stereo images of an image scene received from an imaging device, the pair of stereo images including the first image and a second image, generating an estimated depth map based on the initial depth map by hypothesizing depth values for missing regions in the initial depth map, and warping the second image based on the estimated depth map. The method including generating a warped depth map based on the first image and the warped second image, and generating a new depth map for the first image relative to the second image based on the warped depth map and the estimated depth map.

According to a further aspect, a computer system for generating a depth map includes a processor and an estimated depth map module that causes the processor to generate an initial depth map for a first image, the first image being one of a pair of stereo images of an image scene received from an imaging device, the pair of stereo images including the first image and a second image and generates an estimated depth map based on the initial depth map by hypothesizing depth values for missing regions in the initial depth map. The system includes a depth map refinement module that causes the processor to warp the second image based on the estimated depth map, generate a warped depth map based on the first image and the warped second image and generate a new depth map for the first image relative to the second image based on the warped depth map and the estimated depth map.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
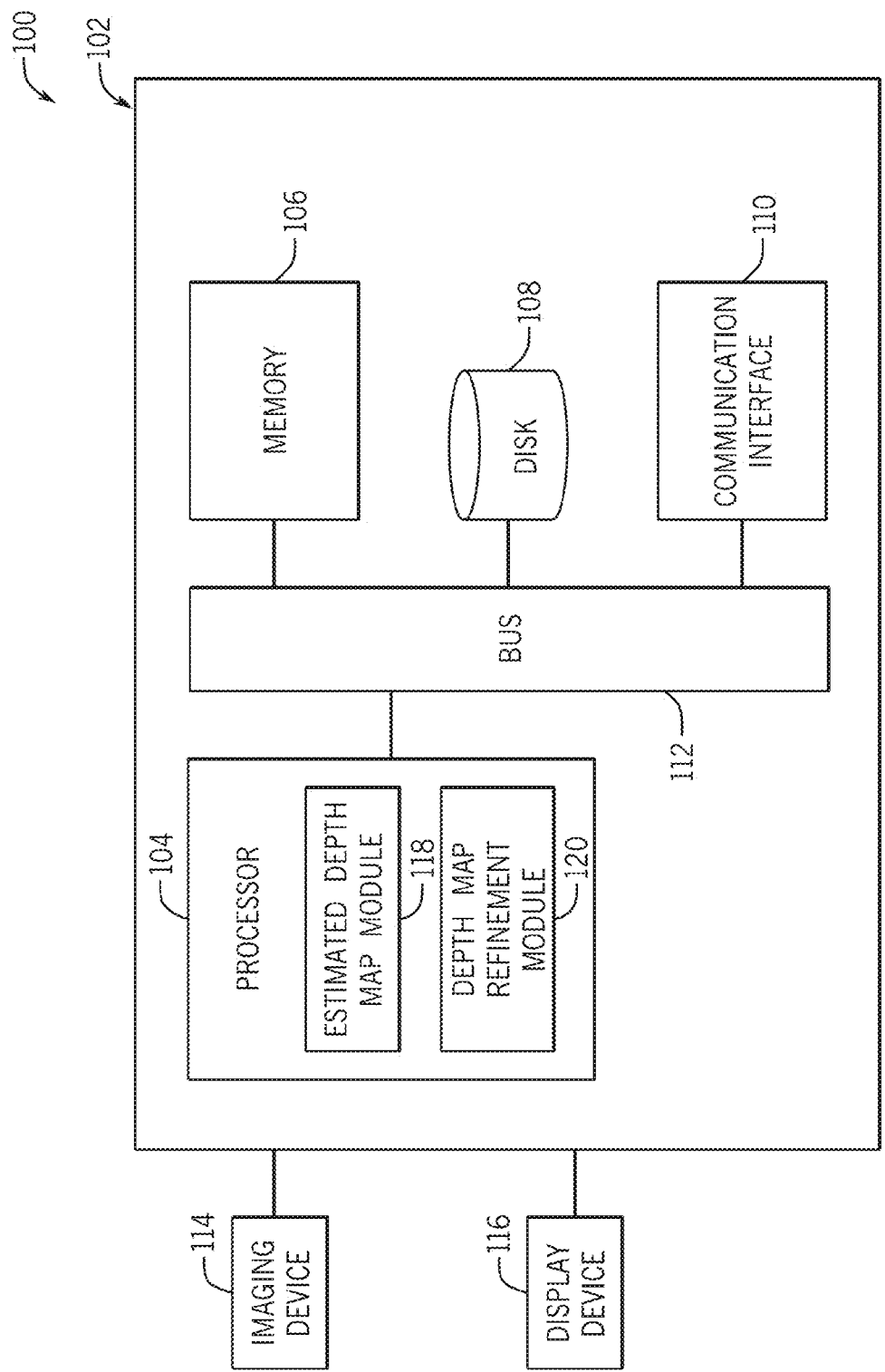
FIG. 1 is a schematic diagram of an exemplary system for generating a depth map through iterative interpolation and warping in accordance with one aspect of the present application.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or into organized into different architectures.

A "bus", as used herein, refers to an interconnected architecture that is operably connected to other computer components inside a computer or between computers. The bus may transfer data between the computer components. Accordingly, the bus may communicate with various devices, modules, logics, and peripherals using other buses. The bus may be a single internal bus interconnect architecture and/or other bus or mesh architectures (e.g., external). The bus may be a memory bus, a memory controller, a peripheral bus, an external bus, a crossbar switch, and/or a local bus, among others. In some embodiments, the bus may be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, portable device, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "depth map", as used herein, is generally an image or image channel that contains information relating to the distance of the surfaces of scene objects from a viewpoint. In some embodiments, the depth map includes a two-dimensional matrix (e.g., an array) of depth values, in which each depth value corresponds to a respective location in a scene and indicates the distance from a certain reference location to the respective scene location. In some embodiments, a disparity map is a depth map where the depth information is derived from offset images of the same scene. A disparity map may be an inverse depth map obtained through transformation given camera calibration parameters.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Local block matching stereo methods", as used herein is a correspondence method for calculating disparities between images. Generally, for each pixel in a first image, a first block is extracted around the pixel. A search is performed in a second image for a second block that best matches the first block. The search is performed in a predetermined range of pixels around the pixel in the first image. The first block and the second block are compared and a pixel is selected with a minimum match cost. The cost functions utilized may include summed absolute difference (SAD), rank transform correlation (NCC) and summed normalized cross-correlation (SNCC), among others.

A "memory", as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

An "input/output" device, as used herein, may include a keyboard, a microphone, a pointing and selection device, cameras, imaging devices, video cards, displays, a disk, network devices, among others. The input/output device may include input/output ports, for example, serial ports, parallel ports and USB ports.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). Additionally, the term "vehicle" can refer to an autonomous vehicle and/or self-driving vehicle powered by any form of energy. The autonomous vehicle may or may not carry one or more human occupants.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

Referring now to the drawings, wherein the showings are for purposes of illustrating one or more exemplary embodiments and not for purposes of limiting the same, FIG. 1 illustrates a schematic diagram of an exemplary system 100 for generating a depth map through iterative interpolation and warping. The components of the system 100, as well as the components of other systems, hardware architectures and software architectures discussed herein, may be combined, omitted or organized into different architecture for various embodiments. Further, the system 100 and/or one or more components of the system 100, may in some embodiments, be implemented with a vehicle or vehicle systems (e.g., infotainment systems, navigations systems, vehicle head units) (not shown).

In the illustrated embodiment of FIG. 1, the system 100 includes a computer 102 with provisions for processing, communicating and interacting with various components the system 100. Generally, the computer 102 includes a processor 104, a memory 106, a disk 108, and a communication interface 110, which are each operably connected for computer communication via a bus 112. The computer may, in some embodiments, be integrated with or associated with a vehicle (not shown), for example an ECU, vehicle head unit, imaging system, among others. The communication interface 112 provides software and hardware to facilitate data input and output between the components of the computer 102 and other components, networks and data sources, which will be described herein. Additionally, as will be discussed in further detail with the systems and the methods discussed herein, the processor 104 includes an estimated depth map module 118 and a depth map refinement module 120.

The computer 102 is also operatively connected for computer communication to an imaging device 114 and a display device 116. The imaging device 114 may include one or more cameras. The imaging device 114 obtains a pair of images of a view. The pair of images may be a first image and a second image of the view. For example, the pair of images may be a left image and a right image of the view. The imaging device 114 may be any type of device for obtaining and/or capturing image data about the view. For example, the imaging device 114 may be one or more stereo cameras, 3D cameras, 2D cameras, mobile depth cameras, video cameras, CCD cameras, CMOS cameras, portable device cameras, among others. Within a vehicle, the imaging device 114 may be located inside the vehicle, or outside the vehicle, for example, forward looking cameras. In other embodiments, the imaging device 114 may include one or more imaging devices from one or more portable devices (not shown) operatively connected for computer communication to the computer 102. In a further embodiment, the pair of images may be obtained from a network (not shown), a database (not shown) or other device storing the pair of images obtained from an imaging device.

In the embodiment shown in FIG. 1, the display device 116 may include input and/or output devices for receiving and/or displaying information from the computer 102. For example, the display device 116 may be an image display screen, touch display screen, the display of a portable device, a display in a vehicle, a heads-up display, an LCD display, among others. In some embodiments, the depth map and images processed in the methods and systems discussed herein may be displayed on the display device 116.

The estimated depth map module 118 and the depth map refinement module 120 of FIG. 1 will now be discussed in detailed with reference to an exemplary system for generating a depth map according to an exemplary embodiment. The estimated depth map module causes the processor to generate an initial depth map for a first image. The first image is one of a pair of stereo images of an image scene (e.g., the same image scene) received from an imaging device, for example the imaging device 114. The pair of stereo images include the first image and a second image of the image scene. In some embodiments, the first image is a left image (e.g., an image showing a left perspective of the image scene) and the second image is a right image (e.g., an image showing a right perspective of the image scene), or vice versa. The exemplary systems and methods discussed herein will be described as the first image being a left image and the second image being a right image, however, as discussed above, other implementations are contemplated. Further, it is understood that in some embodiments the first image and the second image are color stereo images and the system 100 may convert the color stereo images to gray scale (e.g., one-channel images) or the system 100 may process the stereo images in color.

Figure 2A:
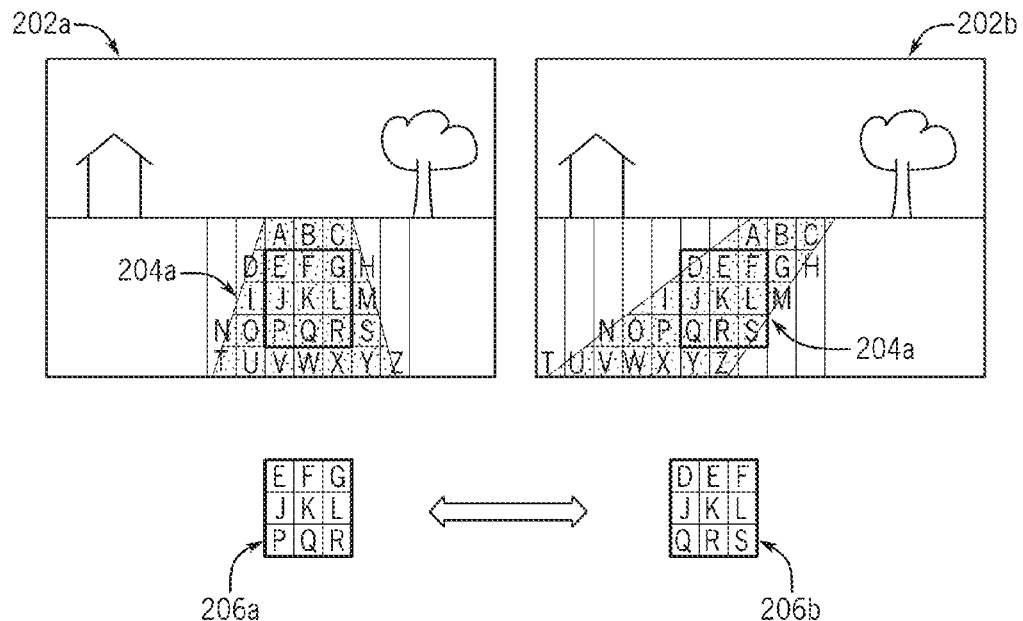
FIG. 2a is an illustrative example of standard local block matching for a slightly slanted surface in accordance with one aspect of the present application.
Figure 2B:
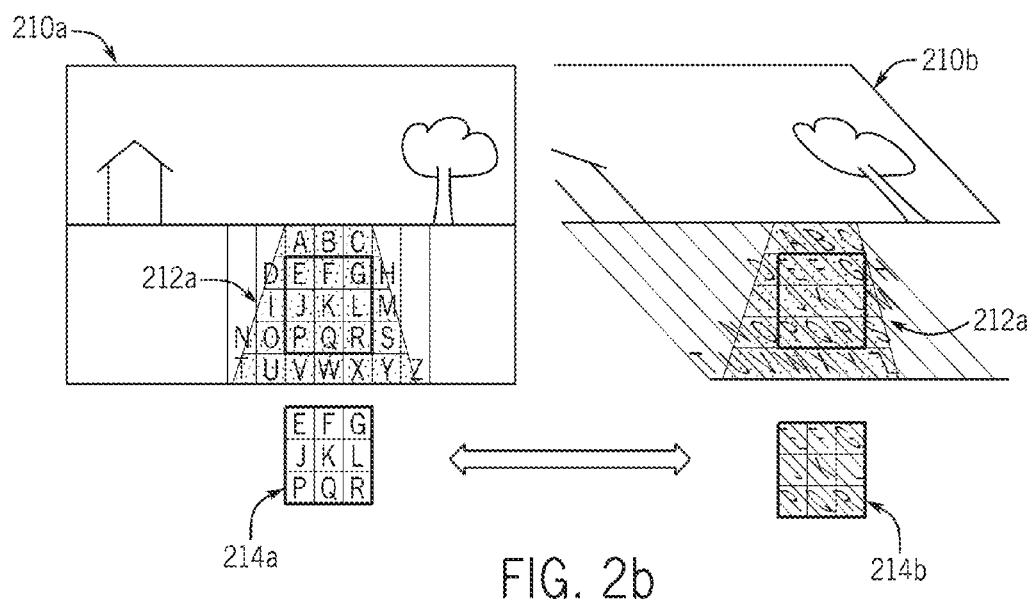
FIG. 2b is an illustrative example of local block matching for a slightly slanted surface according to an exemplary embodiment for generating a depth map through iterative interpolation and warping in accordance with one aspect of the present application.

The pair of stereo images will now be discussed with reference to FIGS. 2a and 2b. FIG. 2a is an illustrative example of standard local block matching for a slightly slanted surface. FIG. 2a includes a first image (e.g., a left image, L) 202a of an image scene and a second image (e.g., a right image, R) 202b of the image scene. In FIGS. 2a and 2b, the image scene is a street view, for example, capture by a forward looking camera (e.g., the imaging device 114) on a vehicle. In the first image 202a and the second image 202b, a street 204a (e.g., an object in the image scene) is slanted with respect to the image planes of both cameras (e.g., viewpoints). As shown in FIG. 2a, a block 206a is computed by a local block matching method in the first image 202a, the block 206a including the street 204a. A block 206b is computed by local block matching in the second image 202b based on the block 206a. The disparity values between the corresponding blocks (i.e., the block 206a and the block 206b) in FIG. 2a vary drastically, due in part, to the highly slanted surface of the street 204a in the second image 202b. This leads to strongly dissimilar corresponding blocks and this dissimilarity may lead to inaccurate correlation values and regions of inaccurate or missing depths in a depth map generated based on the block 206a and the block 206b.

In contrast to FIG. 2a, FIG. 2b is an illustrative example of local block matching for a slightly slanted surface according to an exemplary embodiment for generating a depth map through iterative interpolation and warping. Similar to FIG. 2a, FIG. 2b includes a first image (e.g., a left image, L) 210a of an image scene and a second image (e.g., a right image, R) 210b of the image scene. In the first image 210a and the second image 210b, a street 212a (e.g., an object in the image scene) is highly slanted. However, unlike FIG. 2a where the street is viewed from different viewpoints, an estimated depth map (as described herein) is used to change the viewpoint of image 210b to match that of image 210a. This is achieved by warping image 202b to get image 210b as will be described with the exemplary methods and systems discussed herein. As shown in FIG. 2b, a block 214a is computed by a local block matching method of the first image 210a, including the street 212a. A block 214b is computed by local block matching of the second image 210b, which is warped, based on the block 214a. The disparity values between corresponding blocks (i.e., a block 214a and a block 214b) in FIG. 2b are minimal, which leads to similar corresponding blocks, due in part, to the second image 210b being warped. Accordingly, a depth map generated based on the block 214a and the block 213b will be more accurate.

Referring again to FIG. 1, the estimated depth map module 118 generates an estimated depth map based on the initial depth map by hypothesizing depth values for missing regions in the initial depth map. The depth values for missing regions may be hypothesized using interpolation, for example, horizontal linear interpolation and/or multi-directional interpolation, which will be discussed in more detail with reference to FIGS. 3, 4a and 4b, below. Generally, the initial depth map is generated by the estimated depth map module 118 using a local block matching method, and the estimated depth map is generated by the estimated depth map module 118 by filling in regions with missing depth values using interpolation.

The estimated depth map may be used by the depth map refinement module 120 to warp the second image, for example, as shown by the second image 210b of FIG. 2b. Specifically, the depth map refinement module 120 causes the processor 104 to warp the second image based on the estimated depth map. The depth map refinement module 120 generates a warped depth map based on the first image and the warped second image. The depth map refinement module 120 generates a new depth map for the first image relative to the second image based on the warped depth map and the estimated depth map. In some embodiments, the depth map refinement module 120 generates a new depth map by unwarping the warped depth map. Unwarping the depth map includes the depth map refinement module 120 identifying a disparity between corresponding pixels in the estimated depth map and the warped second image. The disparity is then added to the warped depth map thereby generating the new depth map.

In one embodiment, the processor 104 executes the estimated depth map module 118 and the depth map refinement module 120 iteratively and rewrites the initial depth map with the new depth map output by the depth map refinement module 120. In a further embodiment, the processor 104 executes the estimated depth map module 118 and the depth map refinement module 120 iteratively until it is determined that the corresponding values of the depth map from the previous iteration (e.g., which may be the initial depth map) and the new depth map remain constant. The details of the iteration process will be described in more detail with FIG. 3. This iterative and warping approach increases the percentage of valid depths for local methods while keeping the percentage of pixels with erroneous depths low.

Figure 3:
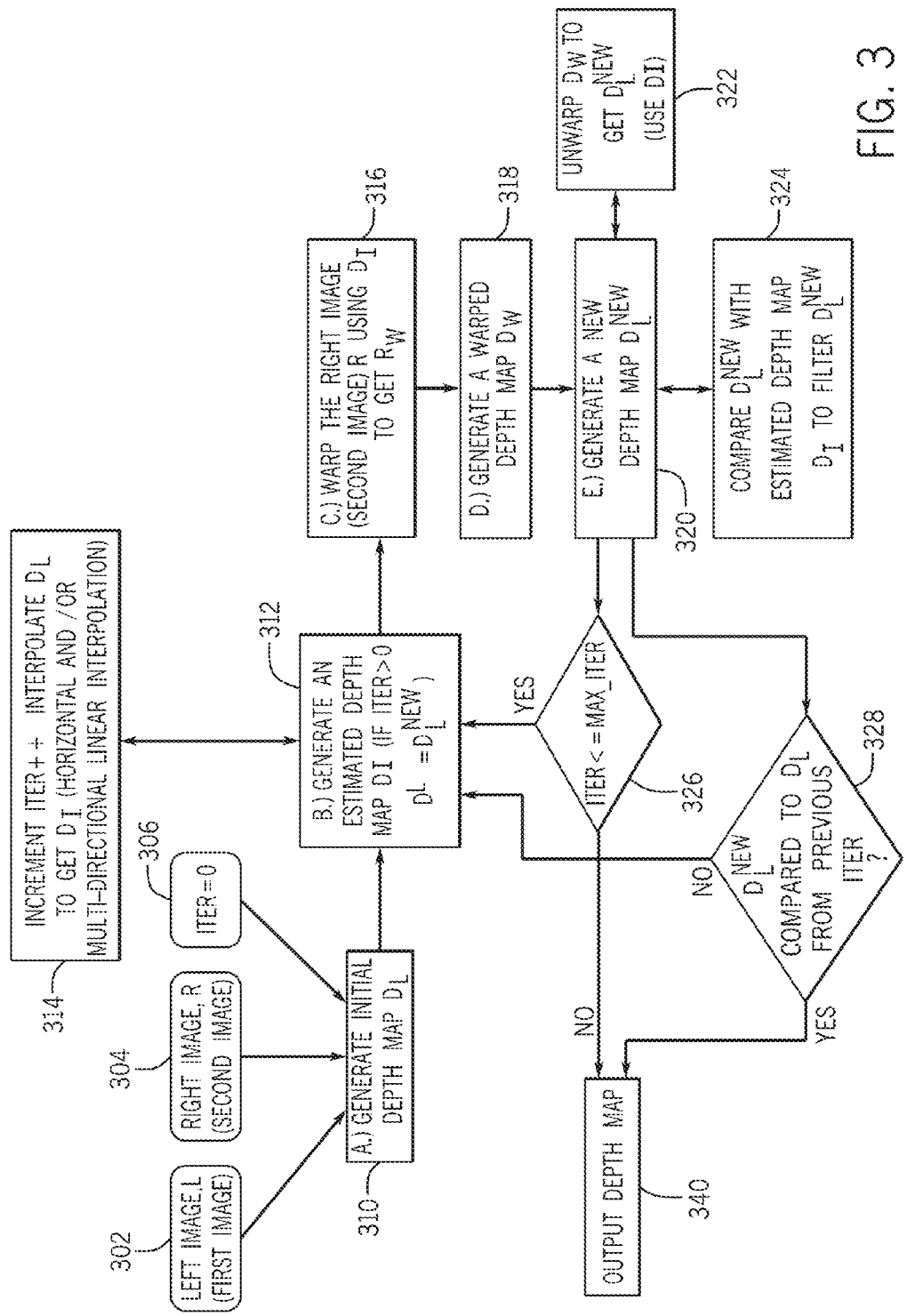
FIG. 3 is a flow chart illustrating an exemplary method for generating a depth map through iterative interpolation and warping in accordance with one aspect of the present application.

The system 100 illustrated in FIG. 1 described above will now be described in with reference to the method of FIG. 3. It will be appreciated that the systems and components discussed above in FIG. 1 may similarly be implemented with the method of FIG. 3. The method of FIG. 3 illustrates an exemplary method for generating a depth map through iterative interpolation and warping. As mentioned above, the method of FIG. 3 will be discussed with a first image being a left image (L) of an image scene and the second image being a right image (R) of the image scene, however, it is understood that the first image could be the right image and the second image could be the left image in other embodiments.

Referring now to FIG. 3, at block 310, the method includes generating an initial depth map for the first image (i.e., the left image, L), denoted herein as $D_L$. In one embodiment, the estimated depth map module 118 of FIG. 1 may generate the initial depth map $D_L$ for the first image (i.e., the left image, L). Specifically, the initial depth map $D_L$ is generated for a first image, the first image being one of a pair of stereo images received from an imaging device, the pair of stereo images including the first image and a second image. In FIG. 3, a left image (i.e., a first image) is received as an input 302 at the block 210 and a right image (i.e., a second image) is received as an input 304 at block 310. The left image and the right image are obtained from, for example, the imaging device 114 of FIG. 1.

The initial depth map $D_L$ is generated from an unwarped left image and an unwarped right image (e.g., the original images; L, R). In some embodiments, the initial depth map $D_L$ is generated using a local block matching method. Additionally, it is understood that other image processing steps may be applied after generating the initial depth map $D_L$, for example, left-right checking and/or removal of small disparity regions. Further, a counter ITER indicating an iteration of a loop is also received as an input 306 at block 310. As shown at input 306, upon a first iteration, ITER is set to 0. The processor 104 of FIG. 1 may maintain the counter ITER. In the method shown in FIG. 3, block 310 is executed upon a first iteration (i.e., ITER=0).

In some situations, even with post processing techniques, the initial depth map $D_L$ has many regions with missing depths (e.g., holes). Accordingly, referring again to FIG. 3, at block 312, the method includes generating an estimated depth map based on the initial depth map by hypothesizing depth values for missing regions in the initial depth map. The estimated depth map is denoted herein as $D_I$. In one embodiment, the estimated depth map module 118 of FIG. 1 generates an estimated depth map based on the initial depth map. As will be explained in further detail herein, if ITER>0, then the estimate depth map is based on the new depth map $D_L^{new}$. Thus, if ITER>0, then $D_L = D_L^{new}$.

Hypothesizing depth values for missing regions may be done in various ways, for example, by interpolation at block 314. At block 314, the ITER counter is incremented by 1, for example, the processor 104, which may maintain the ITER counter, increments the ITER counter by 1. Further at block 314, the depth map $D_L$ is interpolated to get the estimated depth map $D_I$. In one embodiment, generating the estimated depth map based on the initial depth map by hypothesizing depth values for missing regions in the initial depth map includes estimating depth values with horizontal interpolation. In horizontal interpolation, each row is filled horizontally and linearly, interpolating between the first left and right pixel having a valid disparity entry. In one embodiment, the interpolation between the first left and right pixel is completed upon determining that the disparity value is within a predetermine threshold. For example, the predetermined threshold could be set to a number of pixels, for example, 40 pixels. The remaining pixels are filled with the smallest neighboring disparity.

Figure 4A:
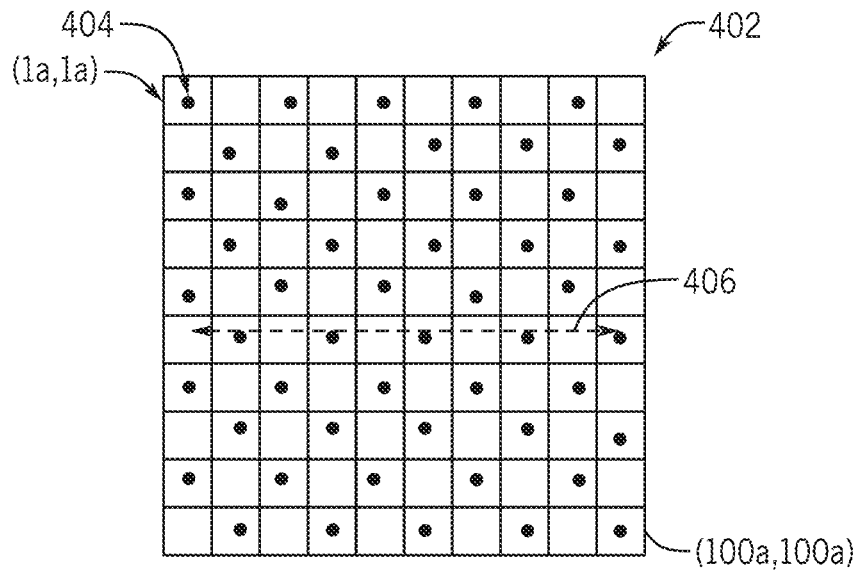
FIG. 4a is a schematic diagram of an exemplary block of pixels used for exemplary horizontal linear interpolation in accordance with one aspect of the present application.

FIG. 4a is a schematic diagram of an exemplary block of pixels 402 used for horizontal linear interpolation. In FIG. 4a, the block of pixels 402 is a 10×10 block of pixels starting from the coordinate (1a, 1a) and extending to the coordinate (100a, 100a). The black dots shown in FIG. 4a (e.g., the black dot 404) are pixels of an image that have a value. If a first image with the block of pixels 402 were to be displayed on, for example, the display device 116 of FIG. 1, without interpolation, there would be missing pixels and regions, because there are some pixels that have no values. For example, the pixel at coordinate (1a, 2a), has no value. The pixels in the block of pixels 402 that do not have a value may be interpolated, and in the example illustrated in FIG. 4a, these pixels are interpolated using horizontal linear interpolation as shown by the arrow 406. Accordingly, in one embodiment, the processor 104 interpolates the value of pixels missing a value using selected pixels from the block of pixels 402. In this embodiment, for example, the value of the pixel located at coordinate (6a, 5a) may be interpolated using valid disparity values for the pixel to the left (e.g., (6a, 4a)) and a valid disparity value for the pixel to the right (e.g., (6a, 6a)). The horizontal linear interpolation may be applied to each row or a subset of rows and/or pixels.

In another embodiment, generating the estimated depth map based on the initial depth map by hypothesizing depth values for missing regions in the initial depth map includes estimating depth values with multi-directional linear interpolation. The multi-directional linear interpolation may be based on the iteration (i.e., ITER). Further, in one embodiment, the direction of interpolation changes for every iteration. For example, the interpolation direction is distributed according to the iteration number around 180 degrees. For example, in the case of two iterations, the first interpolation (i.e., ITER=1) is horizontal at 0 degrees and the second interpolation (i.e., ITER=2) is vertical at 90 degrees. In the case of four iterations, the first interpolation (i.e., ITER=1) is horizontal at 0 degrees, the second interpolation (i.e., ITER=2) is vertical at 90 degrees, the third interpolation (i.e., ITER=3) is at 45 degrees and the fourth interpolation (i.e., ITER=4) is at 135 degrees. The remaining pixels may be filled with the smallest neighboring disparity.

Figure 4B:
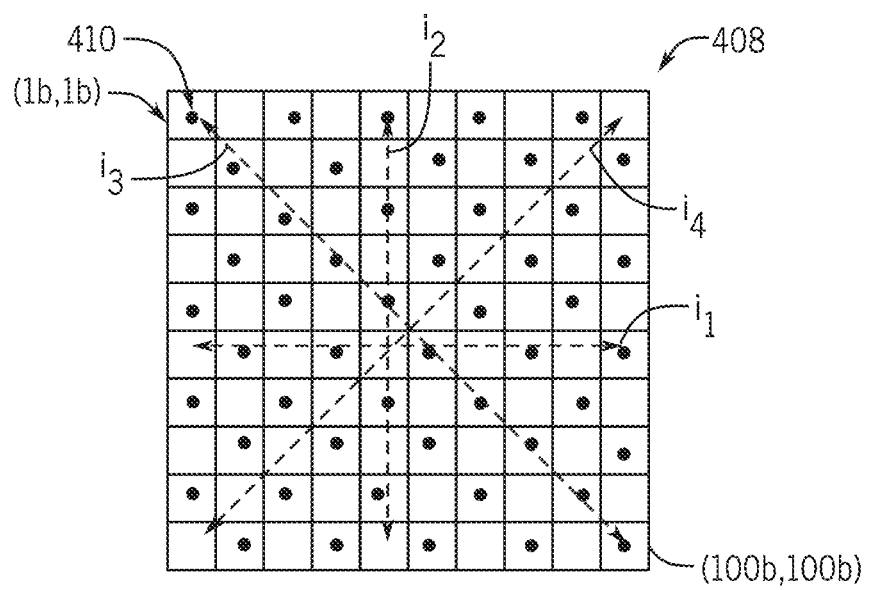
FIG. 4b is a schematic diagram of an exemplary block of pixels used for multi-directional linear interpolation in accordance with one aspect of the present application.

FIG. 4b is a schematic diagram of an exemplary block of pixels 408 used according to exemplary multi-directional linear interpolation. In FIG. 4b, the block of pixels 408 is a 10×10 block of pixels starting from the coordinate (1b, 1b) and extending to (100b, 100b). The black dots shown in FIG. 4b (e.g., the black dot 410), are pixels of an image with a value. If a first image with the block of pixels 408 were to be displayed on, for example, the display device 116 of FIG. 1, without interpolation, there would be missing pixels and regions, because there are some pixels that have no values. For example, the pixel at coordinate (1b, 2b), has no value. The pixels in the block of pixels 408 that do not have a values may be interpolated, and in the example of FIG. 4b, these pixels are interpolated using multi-directional linear interpolation based on the iteration. For example, for the first iteration $i_1$ (i.e., ITER=1), the interpolation is horizontal at 0 degrees. For the second iteration $i_2$ (i.e., ITER=2), the interpolation is vertical at 90 degrees. For the third iteration $i_3$ i.e., (ITER=3), the interpolation is at 45 degrees. For the fourth iteration $i_4$ (i.e., ITER=4), the interpolation is at 135 degrees. It is appreciated that the multi-directional linear interpolation may include one or more interpolations, including more than four iterations. The multi-directional linear interpolation may be applied to each row or a subset of rows and/or pixels.

Referring again to FIG. 3, at step 316 the method includes warping the second image based on the estimated depth map $D_I$. In one embodiment, the depth map refinement module 120 warps the second image based on the estimated depth map $D_I$. In particular, in one embodiment, the estimated depth map $D_I$ is used to warp the right image (R) to get a new image $R_W$. Specifically, warping the second image based on the estimated depth map includes determining an intensity of one or more pixels in the second image based on an intensity of a corresponding pixel in the estimated depth map. Said differently, to generate the new image $R_W$, the intensity at pixel position (x, y) in $R_W$ from R (i.e., the original right image) is calculated as follows:

$$R_W(x,y)=R(x-D_I(x,y),y) \quad (1)$$

Referring again to FIG. 3, at block 318 the method includes generating a warped depth map based on the first image and the warped second image. The warped depth map is denoted herein as $D_W$. In one embodiment, the depth map refinement module 120 generates the warped depth map based on the first image and the warped second image. In the embodiment illustrated in FIG. 3, the warped depth map is based on the left image L and the warped right image $R_W$. Thus, after warping the second image (i.e., $R_W$) differences between the new image pair (L, $R_W$) are reduced. Accordingly, a new disparity map (i.e., $D_W$) based on the new image pair is less prone to perspective effects because the new image pair are much more similar to each other.

When finding correspondences between the left image and the warped right image, positive and negative disparities are searched. In particular, negative disparities are searched because the disparity estimates in $D_I$ may be higher than the real disparity for some pixels and as a result, the pixels in the warped right image might have been shifted too much to the right. Thus, in one embodiment, the overall disparity search range may be modified for each iteration. For example, the disparity search range may be reduced in the following iterations. As an illustrative example, the original search range may be from 0 to 128 pixels, whereas the search range in subsequent iterations may be as low as −8 to 8 pixels. Additionally, it is understood that other post processing steps may be applied to the warped disparity map, for example, left-right check and removal of small disparity regions.

At block 320, the method includes generating a new depth map for the first image relative to the second image based on the warped depth map and the estimated depth map. The new depth map is indicated as $D_L^{new}$. In one embodiment, generating the new depth map includes unwarping the warped depth map at block 322. In the embodiment illustrated in FIG. 3, the warped depth map $D_W$ contains disparities that relate pixels in the left image to pixels in the warped right image (i.e., $R_W$). Thus, the warped depth map needs to be "unwarped" to get depth values relative to the original right image, and subsequently, generate a new depth map.

In one embodiment, unwarping the warped depth map includes identifying a disparity between corresponding pixels in the estimated depth map and the warped second image and adding the disparity to the warped depth map. Specifically, the disparity by which the corresponding pixel in the warped right image was shifted is added to $D_W$ and the interpolated depth map, denoted $D_I$ is used since the warped right image was obtained using the interpolated depth map, as follows:

$$D_L^{new}(x,y)=D_W(x,y)+D_I(x-D_W(x,y),y) \quad (2)$$

In one embodiment, the new depth map may also be further filtered to prevent accumulation of errors over multiple iterations. Specifically, the values of pixels in the estimated depth map are either rejected or accepted based on whether the values of the pixels in the estimated depth map match the value of the pixels in the warped depth map as shown at block 324. In one embodiment, the new depth map is checked to ensure the new depth map does not have any disparities outside the original search range of the local block matching at block 314. Further, pixels which have correct estimated depth values in the last iteration (i.e., after the two post-processing checks) are reassigned their last values, and pixels that had depth values computed for the first time in the current iteration are allowed to keep their depth values only if they are within a threshold of the interpolated (e.g., estimated) depth values. For example, $D_L^{new}$ (x, y) is only accepted if:

$$|D_L^{new}(x,y)-D_I(x,y)|<t \quad (3)$$

Where t is a predetermined value of pixels, for example, 0.5 pixels. Accordingly, older disparities are favored and disparities that don't match with the interpolated disparities are discarded.

Referring again to the method of FIG. 3, the blocks of FIG. 3 may be carried out iteratively. In particular, in the following iteration, the depth map $D_L$, (which may be the initial depth map), is replaced with the new depth map $D_L^{new}$ generated at block 320. In one embodiment the blocks of FIG. 3 are carried out iteratively for a fixed number of iterations. As shown at block 326, it is determined if ITER is <=MAX_ITER, where MAX_ITER is a predetermined value. If YES, the method continues to block 312 to generate an estimated depth map $D_I$.

If NO, the method ends, and in one embodiment, at block 340 the new depth map is output, for example, to the display 116 (FIG. 1). In some embodiments, the new depth map is output and may be processed further.

In another embodiment, the method includes at block 328 comparing the new depth map $D_L^{new}$ to the depth map $D_L$ from the previous iteration. The method continues iteratively until it is determined that the corresponding values between the new depth map $D_L^{new}$ and the previous depth map $D_L$ are constant. If at block 328, the corresponding values between the new depth map and the initial depth map are not constant (NO), the method continues to block 312 to generate an estimated depth map $D_I$. If at block 328, the corresponding values between the new depth map and the previous depth map are constant (YES), the method ends, and in one embodiment at block 326 the new depth map is output, for example, to the display 116. In some embodiments, the new depth map is output and may be processed further. This iterative and warping approach increases the percentage of valid depths for local methods while keeping the percentage of pixels with erroneous depths low.

Figure 5A:
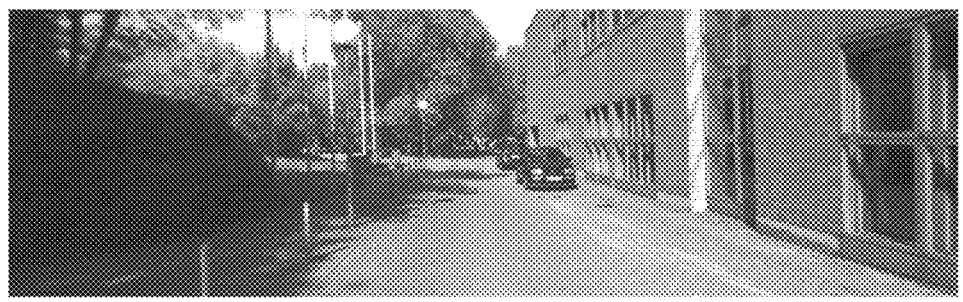
FIG. 5a is an exemplary left stereo image in accordance with one aspect of the present application.
Figure 5B:
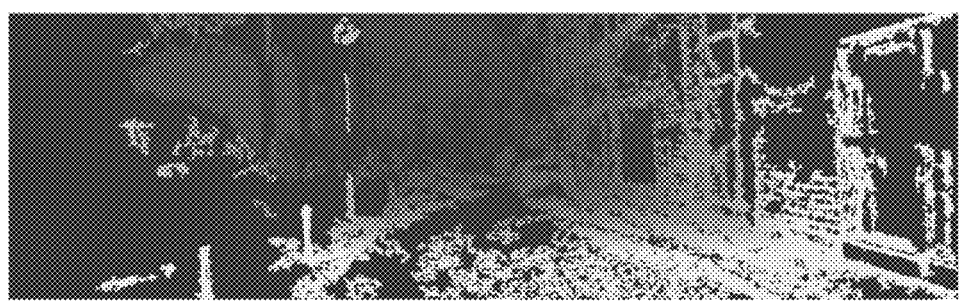
FIG. 5b is an exemplary disparity map of the left stereo image of FIG. 5a in accordance with one aspect of the present application.
Figure 5C:
FIG. 5c is an exemplary disparity map of the left stereo image of FIG. 5a after one iteration in accordance with one aspect of the present application.
Figure 5D:
FIG. 5d is an exemplary disparity map of the left stereo image of FIG. 5a after eight iterations in accordance with one aspect of the present application.

Referring now to FIGS. 5a-5d, exemplary results of the systems and methods discussed herein will now be described. FIG. 5a is an exemplary left stereo image. For example, the first image 210a of FIG. 2b and/or the left image received as input 302 in FIG. 3. The left stereo image of FIG. 5a is a street view taken from, for example, a forward looking camera on a vehicle (e.g., from the imaging device 114). The left stereo image of FIG. 5a has been reproduced in gray scale. FIG. 5b is an exemplary disparity map of the left stereo image of FIG. 5a using standard local block matching methods, for example, as described with FIG. 2a. FIG. 5c is an exemplary disparity map of the left stereo image of FIG. 5a after one iteration according to the systems and methods of iterative interpolation and warping discussed herein. As shown in FIG. 5c, there is significant improvement in depth estimates for the road and some improvements for the building as compared to the disparity map in FIG. 5b. In some embodiments, it has been found that density may be increased by an average of 7-13% after one iteration. FIG. 5d is an exemplary disparity map of the left stereo image of FIG. 5a after eight iterations according to the systems and methods of iterative interpolation and warping discussed herein. As shown in FIG. 5d, there are significant improvements in the depth estimates for the road, the building, and the bush on the left side of the image. Accordingly, this iterative and warping approach increases the percentage of valid depths for local methods while keeping the percentage of pixels with erroneous depths low.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for generating a depth map, comprising:
   generating an initial depth map for a first image, the first image being one of a pair of stereo images received from an imaging device, the pair of stereo images including the first image and a second image;
   generating an estimated depth map based on the initial depth map by hypothesizing depth values for missing regions in the initial depth map;
   warping the second image based on the estimated depth map;
   generating a warped depth map based on the first image and the warped second image; and
   generating a new depth map for the first image relative to the second image based on the warped depth map and the estimated depth map.

2. The computer-implemented method of claim 1, wherein claim 1 is carried out iteratively, and the initial depth map is replaced with the new depth map in each iteration.

3. The computer-implemented method of claim 2, wherein claim 1 is carried out iteratively for a fixed number of iterations.

4. The computer-implemented method of claim 2, comprising comparing the new depth map to the initial depth map and claim 1 is carried out iteratively until it is determined that the corresponding values between the new depth map and the previous depth map are constant.

5. The computer-implemented method of claim 1, wherein generating the estimated depth map based on the initial depth map by hypothesizing depth values for missing regions in the initial depth map includes hypothesizing depth values with horizontal linear interpolation.

6. The computer-implemented method of claim 2, wherein generating the estimated depth map based on the initial depth map by hypothesizing depth values for missing regions in the initial depth map includes hypothesizing depth values with multi-directional interpolation based on the iteration.

7. The computer-implemented method of claim 6, wherein the direction of interpolation changes for every iteration.

8. The computer-implemented method of claim 1, wherein warping the second image based on the estimated depth map includes determining an intensity of one or more pixels in the second image based on an intensity of a corresponding pixel in the estimated depth map.

9. The computer-implemented method of claim 1, wherein generating the new depth map includes unwarping the warped depth map, wherein unwarping the warped depth map includes identifying a disparity between corresponding pixels in the estimated depth map and the warped second image and adding the disparity to the warped depth map, thereby generating the new depth map.

10. A non-transitory computer readable medium comprising instructions that when executed by a processor perform a method for generating a depth map, comprising:
   generating an initial depth map for a first image, the first image being one of a pair of stereo images of an image scene received from an imaging device, the pair of stereo images including the first image and a second image;
   generating an estimated depth map based on the initial depth map by hypothesizing depth values for missing regions in the initial depth map;
   warping the second image based on the estimated depth map;

generating a warped depth map based on the first image and the warped second image; and generating a new depth map for the first image relative to the second image based on the warped depth map and the estimated depth map.

11. The non-transitory computer readable medium of claim 10, wherein the processor executes claim 10 iteratively and rewrites the initial depth map with the new depth map at each iteration.

12. The non-transitory computer readable medium of claim 10, wherein the processor executes claim 10 iteratively until the processor determines that the values of the new depth map remain constant when compared to the depth map from the previous iteration.

13. The non-transitory computer readable medium of claim 10, wherein generating a new depth map includes unwarping the warped depth map by identifying a disparity between corresponding pixels in the estimated depth map and the warped second image and adding the disparity to the warped depth map thereby generating the new depth map.

14. A computer system for generating a depth map, comprising:

a processor; and a memory operatively connected for computer communication to the processor, the memory storing an estimated depth map module and a depth map refinement module with instructions for execution by the processor, wherein the estimated depth map module that causes the processor to generate an initial depth map for a first image, the first image being one of a pair of stereo images of an image scene received from an imaging device, the pair of stereo images including the first image and a second image and generates an estimated depth map based on the initial depth map by hypothesizing depth values for missing regions in the initial depth map, and wherein depth map refinement module that causes the processor to warp the second image based on the estimated depth map, generate a warped depth map based on the first image and the warped second image and generate a new depth map for the first image relative to the second image based on the warped depth map and the estimated depth map.

15. The system of claim 14, wherein the processor executes the estimated depth map module and the depth map refinement module iteratively and rewrites the initial depth map with the new depth map output by the depth map refinement module.

16. The system of claim 14, wherein the processor executes the estimated depth map module and the depth map refinement module iteratively until it is determined that the corresponding values of initial depth map and the new depth map remain constant.

17. The system of claim 14, wherein the depth map refinement module causes the processor to unwarp the warped depth map by identifying a disparity between corresponding pixels in the estimated depth map and the warped second image.

18. The system of claim 17, wherein unwarping the depth map includes the depth map refinement module causing the processor to add the disparity to the warped depth map.

* * * * *